United States Patent
Osmer et al.

(10) Patent No.: US 6,362,719 B1
(45) Date of Patent: Mar. 26, 2002

(54) ROTARY POSITION SENSOR USING A STRAIN GAGE

(75) Inventors: William G. Osmer, Granger; Jeffrey McCurley, Bristol; Robert Rainey, Elkhart, all of IN (US); David Stewart, Edinburgh (GB)

(73) Assignee: CTS Corporation, Elkhart, IN (US)

( * ) Notice: Subject to any disclaimer, the term of this patent is extended or adjusted under 35 U.S.C. 154(b) by 0 days.

(21) Appl. No.: 09/783,440

(22) Filed: Feb. 14, 2001

(51) Int. Cl.[7] .................................................. G01L 1/22
(52) U.S. Cl. .................................. 338/2; 338/6; 338/47
(58) Field of Search ........................... 338/2, 5, 6, 114, 338/47, 106, 99, 100, 101, 113

(56) References Cited

U.S. PATENT DOCUMENTS

| | | | |
|---|---|---|---|
| 3,664,203 A | * 5/1972 | Pataki | 74/55 |
| 3,851,292 A | 11/1974 | Seitz | |
| 4,206,636 A | 6/1980 | Hendrix | |
| 4,567,377 A | * 1/1986 | Amlani et al. | 307/112 |
| 4,575,367 A | 3/1986 | Karmel | |
| 4,691,117 A | * 9/1987 | Greenwood et al. | 307/119 |
| 5,116,051 A | 5/1992 | Moncrief | |
| 5,233,882 A | * 8/1993 | Byram et al. | 74/514 |
| 5,526,208 A | 6/1996 | Hatch | |
| 5,828,290 A | 10/1998 | Buss | |
| 5,963,124 A | 10/1999 | Buss | |
| 6,031,448 A | 2/2000 | Starkweather | |
| 6,040,756 A | 3/2000 | Kaijala | |
| 6,080,053 A | * 7/2000 | Sacki | 399/165 |
| 6,161,891 A | 12/2000 | Blakesley | |

* cited by examiner

*Primary Examiner*—Lincoln Donovan
*Assistant Examiner*—Kyung S. Lee
(74) *Attorney, Agent, or Firm*—Mark P. Bourgeois; Mark W. Borgman

(57) ABSTRACT

A rotary position sensor for sensing the position of an attached rotating object. The rotary position sensor uses a strain gage to detect the position of the object. The sensor includes a housing and a rotor located in the housing. The rotor is attachable to the object. A strain gage is positioned in the housing adjacent the rotor. The rotor rotates so as to contact the strain gage and apply a strain to the strain gage. The strain gage generates an electrical signal that is proportional to the position of the object.

17 Claims, 5 Drawing Sheets

ROTARY POSITION SENSOR USING A STRAIN GAGE

BACKGROUND OF THE INVENTION

1. Field of the Invention

This invention pertains to rotary or angular position sensors which are both durable and precise for application in rugged and demanding environments, particularly for application with internal combustion engines or in pedal assemblies.

2. Description of the Prior Art

There are a variety of known techniques for angular position sensing. Optical, resistive, electrical, electrostatic and magnetic fields are all used with apparatus to measure position. There are many known apparatus for using these energies for sensing. A few of the known apparatus are resistive contacting sensors, inductively coupled ratio detectors, variable reluctance devices, capacitively coupled ratio detectors, optical detectors using the Faraday effect, photo-activated ratio detectors, radio wave directional comparators, and electrostatic ratio detectors. There are many other known detectors, too numerous to mention herein.

These detection methods tend to each offer much value for one or more applications, but none meet all application requirements for all position sensing applications. The limitations may be due to cost, sensitivity to particular energies and fields, resistance to contamination and environment, stability, ruggedness, linearity, precision, or other similar factors. Transportation applications generally, and specifically automotive applications, are very demanding. Temperatures may rise to 150 degrees Centigrade or more, with road contaminants such as salt and dirt splashing upon the engine compartment. This may occur while the engine is still extremely hot from operation. At the other extreme, an engine is expected to perform in the most northern climates without fault, and without special preheating.

Presently, most throttle position sensors are manufactured using a resistive sensor combined with a sliding contactor structure. The sliding contact serves to "tap" the resistor element and provide a voltage proportional to position. The resistive sensor has proven to offer the greatest performance for cost in throttle position sensing applications, unmatched by any other technology to date. However, the resistive throttle position sensors are not without limitations. An automotive position sensor must endure many millions or even billions of small motions referred to in the industry as dithers. These dithers are the result of mechanical motion and vibration carried into the position sensor. Additionally, during the life of a throttle position sensor, there may be a million or more full stroke cycles of motion. In resistive sensors, these motions can affect signal quality. In spite of this shortcoming, throttle position sensors are resistive sensors. Over the years, efforts at improving the contactor-element interface have vastly improved the performance of these devices. Similar improvements in packaging and production have maintained cost advantage. A replacement component must be able to meet throttle position sensor performance requirements while offering similar price advantage.

The combination of temperature extremes and contamination to which an automotive sensor is exposed causes the industry to explore very rugged and durable components. One particular group of sensors, those which utilize magnetic energy, have been developed for these demanding applications. This is because of the inherent insensitivity of the magnetic system to contamination, together with durability characteristic of the components. However, magnetic position sensors have issues with linearity and maintaining tolerances. The magnetic sensors are subjected to both radial and axial forces that change the alignment of the rotor portion of the sensor with respect to the stationary portion (stator). Somewhere in the system is at least one bearing, and this bearing will have a finite amount of play, or motion. This play results in the rotor moving relative to the stator. Unfortunately, these magnetic sensors tend to be very sensitive to mechanical motion between the rotor and stator. As noted, this motion may be in an axial direction parallel to the axis of rotation, or may be in a radial direction perpendicular to the axis, or a combination thereof.

Typical magnetic sensors use one or a combination of magnets to generate a field across an air gap. The magnetic field sensor, be this a Hall effect device or a magnetoresistive material or some other magnetic field sensor, is then inserted into the gap. The sensor is aligned centrally within the cross-section of the gap. Magnetic field lines are not constrained anywhere within the gap, but tend to be most dense and of consistent strength centrally within the gap. Various means may be provided to vary the strength of the field monitored by the sensor, ranging from shunting the magnetic field around the gap to changing the dimensions of the gap. Regardless of the arrangement and method for changing the field about the sensor, the magnetic circuit faces several obstacles which degrade the performance of magnetic position sensors. Movement of the sensor relative to the gap, which is the result of axial and radial play between the rotor and stator, will lead to a variation in field strength measured by the sensor. This effect is particularly pronounced in Hall effect, magneto-resistive and other similar sensors, where the sensor is sensitive about a single axis and insensitive to perpendicular magnetic fields. The familiar bulging of field lines jumping a gap illustrates this, where a Hall effect sensor not accurately positioned in the gap will measure the vector fraction of the field strength directly parallel to the gap. In the center of the gap, this will be equal to the full field strength. The vector fraction perpendicular thereto will be ignored by the sensor, even though the sum of the vectors is the actual field strength at that point. As the sensor is moved from the center of the gap, the field begins to diverge, or bulge, resulting in a greater fraction of the field vector being perpendicular to the gap. Since this will not be detected by the sensor, the sensor will provide a reading of insufficient magnitude.

In addition to the limitations with regard to position and field strength, another set of issues must be addressed. A position sensor of value in the transportation industry must be precise in spite of fluctuating temperatures. In order to gain useful output, a magnet must initially be completely saturated. Failure to do so will result in unpredictable magnet performance. However, operating at complete saturation leads to another problem referred to in the trade as irreversible loss. Temperature cycling, particularly to elevated temperatures, permanently decreases the magnetic output. A magnet also undergoes aging processes not unlike those of other materials, including oxidation and other forms of corrosion. This is commonly referred to as structural loss. Structural and irreversible loss must be understood and dealt with in order to provide a reliable device with precision output. Another significant challenge in the design of magnetic circuits is the sensitivity of the circuit to surrounding ferromagnetic objects. For transportation applications a large amount of iron or steel may be placed in very close proximity to the sensor. The sensor must not respond to this external influence.

A current unmet need exists for a rotary position sensor that is not subject to wear, and contamination problems, and that is accurate, reliable and can be produced at a low cost. The preferred embodiment of the invention is designed to solve the problems herein described and other problems not discussed, which are discoverable by a skilled artisan.

SUMMARY OF THE INVENTION

It is a feature of the invention to provide a rotary position sensor for sensing the position of an attached rotating object. The rotary position sensor uses a strain gage to detect the position of the object. Yet, another feature of the invention is to provide a position sensor for sensing the position of an object. The sensor includes a housing and a rotor that is attachable to the object and is located in the housing. A strain gage is positioned in the housing adjacent the rotor. The rotor rotates so as to contact the strain gage and apply a strain to the strain gage. The strain gage generates an electrical signal that is proportional to the position of the object. Several terminals are attached to the housing and are electrically connected to the strain gage. The strain gage has a strain sensitive resistor mounted on it.

The invention resides not in any one of these features per se, but rather in the particular combination of all of them herein disclosed and claimed. Those skilled in the art will appreciate that the conception, upon which this disclosure is based, may readily be utilized as a basis for the designing of other structures, methods and systems for carrying out the several purposes of the present invention. Further, the abstract is neither intended to define the invention of the application, which is measured by the claims, neither is it intended to be limiting as to the scope of the invention in any way.

Figure 1:
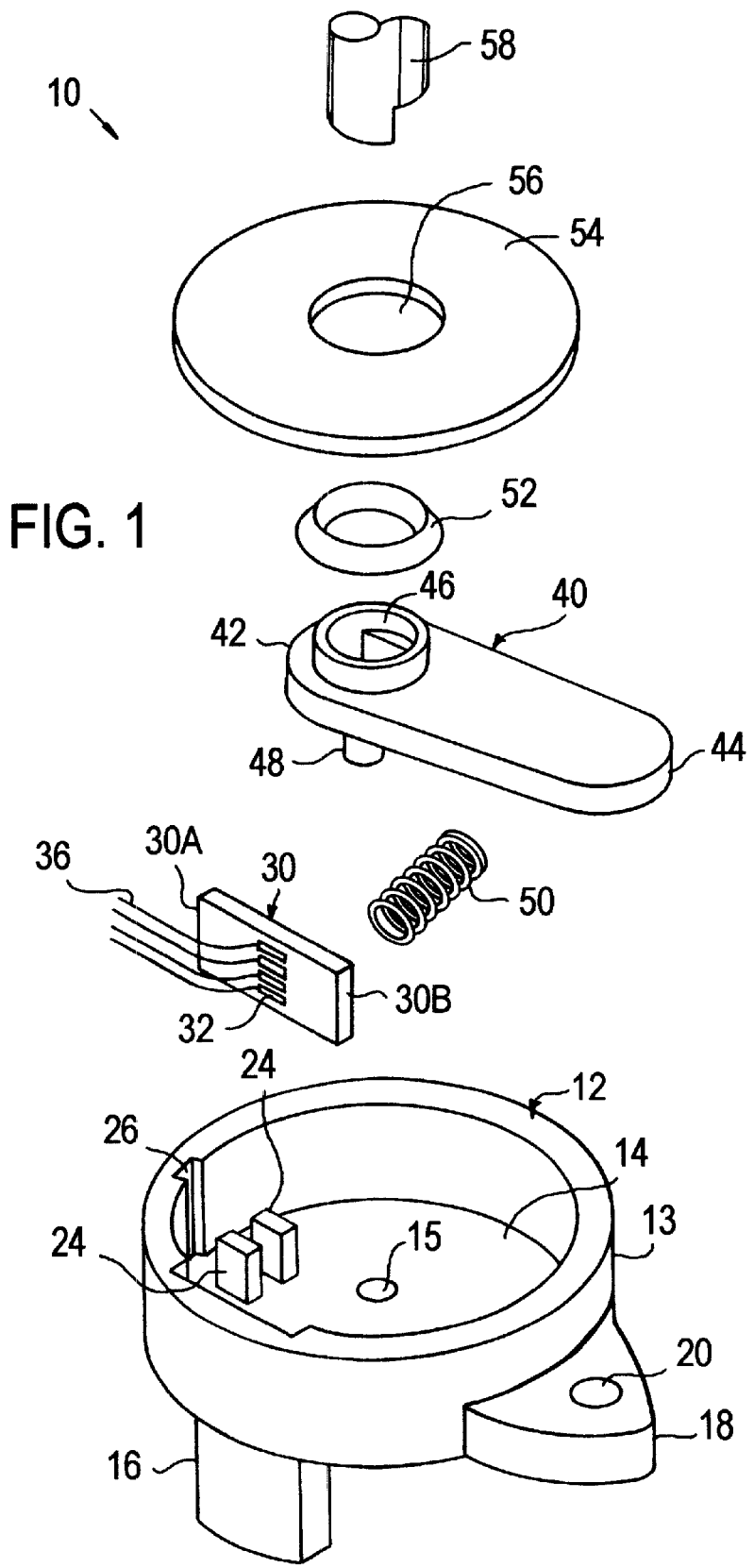
FIG. 1 is an exploded perspective view of the preferred embodiment of a Rotary Position Sensor Using a Strain Gage.

It is noted that the drawings of the invention are not to scale. The drawings are intended to depict only typical embodiments of the invention, and therefore should not be considered as limiting the scope of the invention. In the drawings, like numbering represents like elements between the drawings.

DETAILED DESCRIPTION OF THE PREFERRED EMBODIMENT(s)

Figure 2:
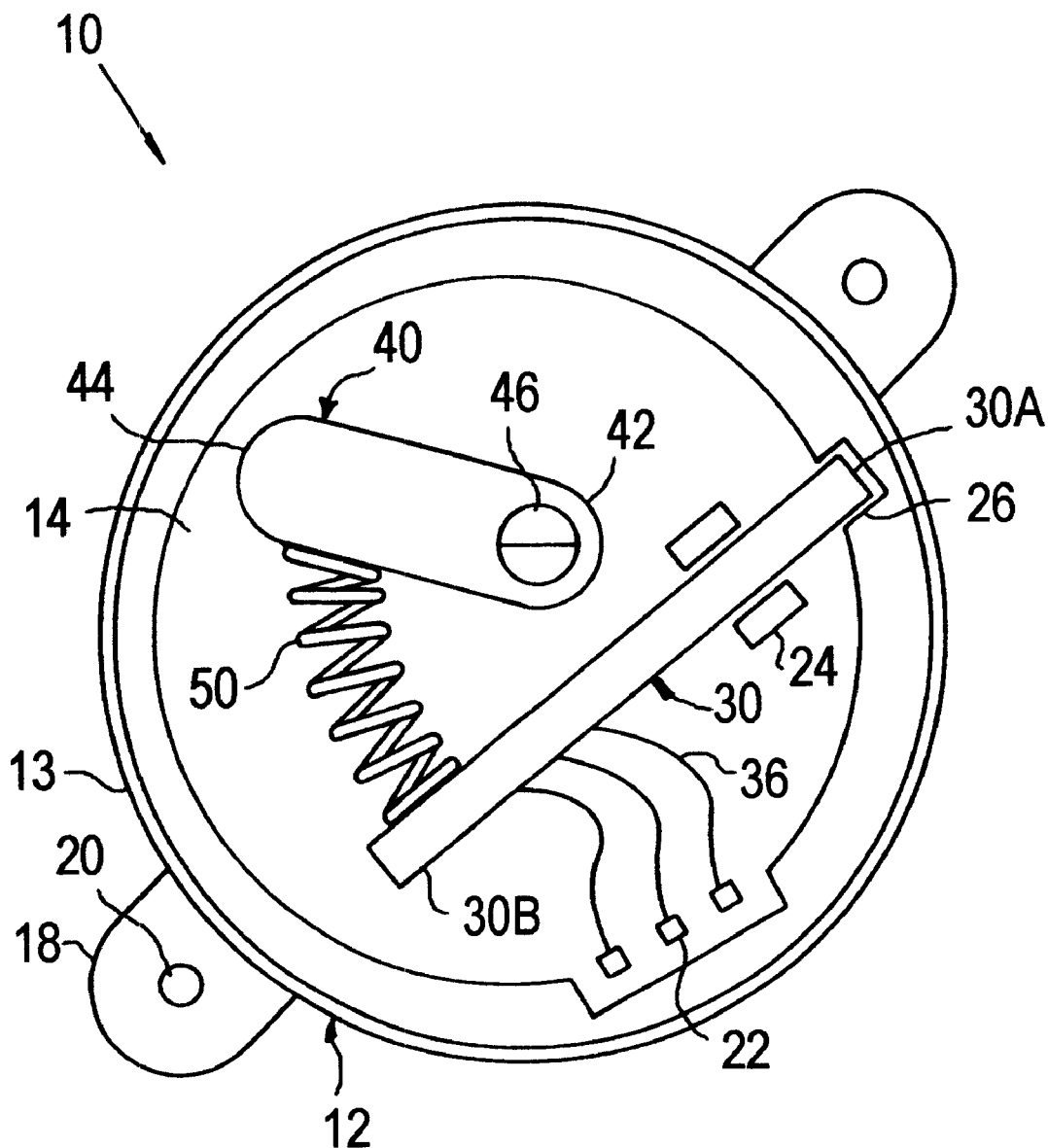
FIG. 2 is a top assembled view of FIG. 1 with the cover removed.

Referring to FIGS. 1 and 2, a preferred embodiment of a rotary position sensor using a strain gage 10 is shown. A housing 12 has an outer circumferential wall 13 that defines a cavity 14. A bore 15 is located at the bottom of cavity 14. A connector shroud 16 and a pair of mounting flanges 18 extend from housing 12. Mounting flanges 18 have a mounting hole 20 passing therethrough for bolting or screwing to a mounting location. Terminals 22 are located in connector shroud 16 for connecting with an external electrical connector (not shown). Only three terminals are shown, more or less may be required. Terminals 22 may be molded in shroud 16 or inserted by pressing. A pair of support posts 24 extend upwardly from the bottom of the cavity. A slot 26 extends into wall 13 from cavity 14. A strain gage 30 has one end 30A that is held in slot 26 and a free end 30B. The support posts 24 help to support strain gage 24 in cavity 14. Strain gage 30 has four strain sensitive resistors 32 mounted thereon and connected in a Wheatstone bridge configuration. Strain gage 30 is preferably formed from steel. Strain sensitive resistors 32 are preferably conventional thick film resistors. Details of the manufacture and design of strain gage 30 is disclosed in U.S. Pat. No. 6,161,891, issued Dec. 19, 2000 and entitled, "Vehicle Seat Weight Sensor", the contents of which are herein included by reference in entirety. The strain sensitive resistors 32 are connected to terminals 22 by wires 36. Wires 36 may be attached to the resistors and terminals by conventional methods such as soldering or ultrasonic wire bonding.

A rotor 40 has an end 42, another end 44, a recess 46 and a protrusion 48. Protrusion 48 fits into bore 15 in order to retain rotor 40 in cavity 14. A spring 50 is compressed between strain gage end 30B and rotor end 44. A cover 54 is ultrasonically welded or heat staked to wall 13 to seal the sensor 10. Cover 54 has a shaft aperture 56 that allows shaft 58 of an attached object to pass through cover 54. The shaft is part of the object whose position is desired to be sensed. Shaft 58 has a D shape that fits into the D shape of recess 46. Shaft 58 drives or rotates rotor 40 during operation of sensor 10. A seal 52 fits over shaft 58 to seal cavity 14 from potentially harmful external environmental conditions.

Rotary position sensor using a strain gage 10 operates as follows: a rotating shaft 58 of an external device whose position is desired to be sensed is located in aperture 56 and as the shaft rotates, rotor 40 also rotates toward or away from strain gage 30. As rotor 40 rotates toward strain gage 30, spring 50 is compressed, which presses on end 30B of strain gage 30. An external voltage is applied to some of terminals 22 and flows through resistors 32. As the spring compresses, the force on end 30B causes strain to be applied to the resistors 32. The strain in resistors 32 causes their electrical resistance to change and subsequently the voltage drop across the resistors to change. The resistors are connected in a Wheatstone bridge configuration. The electrical output signal from the bridge is connected to another terminal which can connect with an external electrical connector such as a wiring harness. Thus, as the shaft 58 rotates, an electrical signal is generated that is indicative of the position of the attached object. Similarly, when the rotor 40 rotates away from strain gage 30, the strain on resistors 32 will be reduced and the electrical signal will change accordingly.

Figure 3:
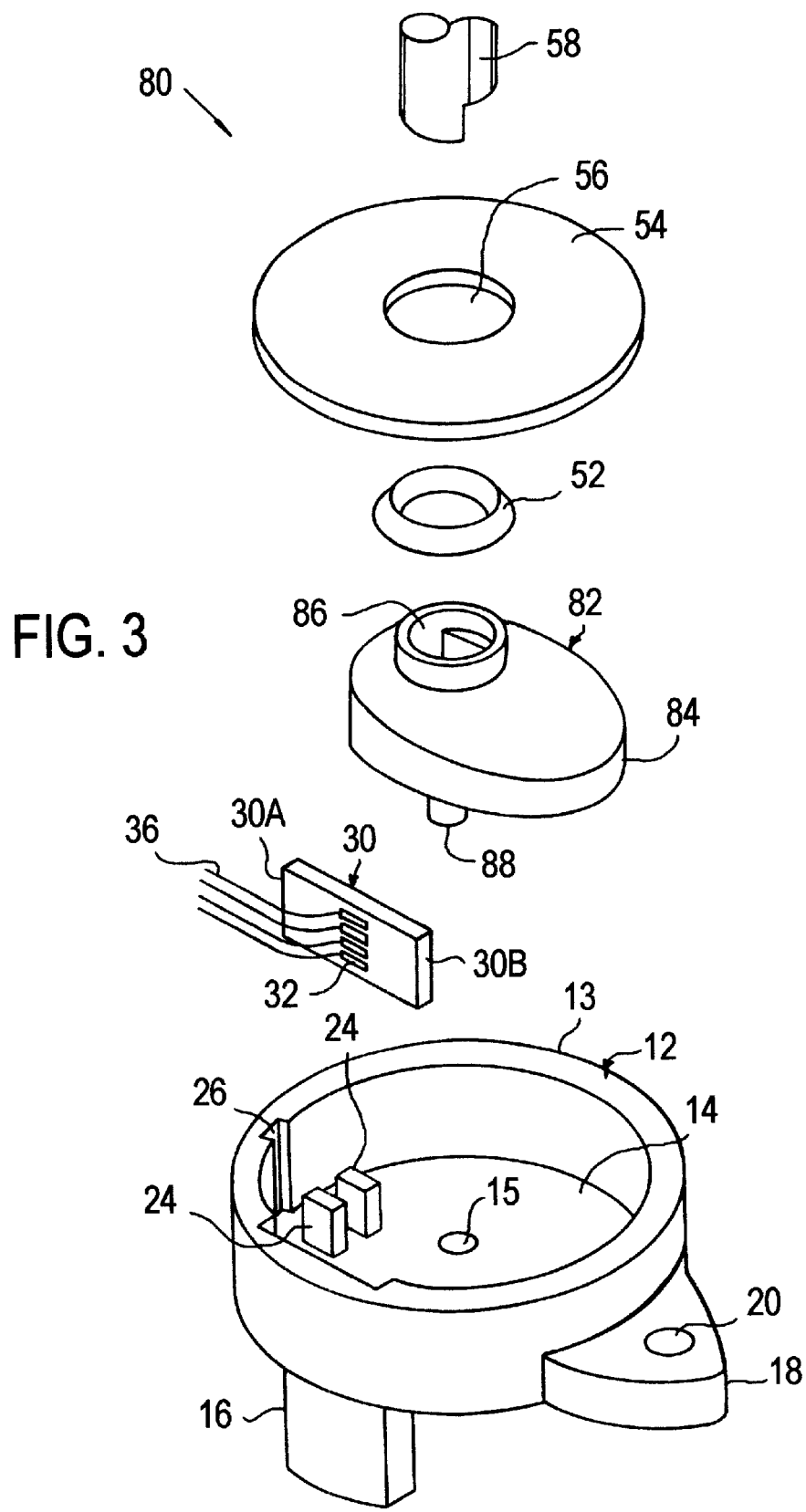
FIG. 3 is an exploded perspective view of an alternative embodiment of a Rotary Position Sensor Using a Strain Gage.
Figure 4:
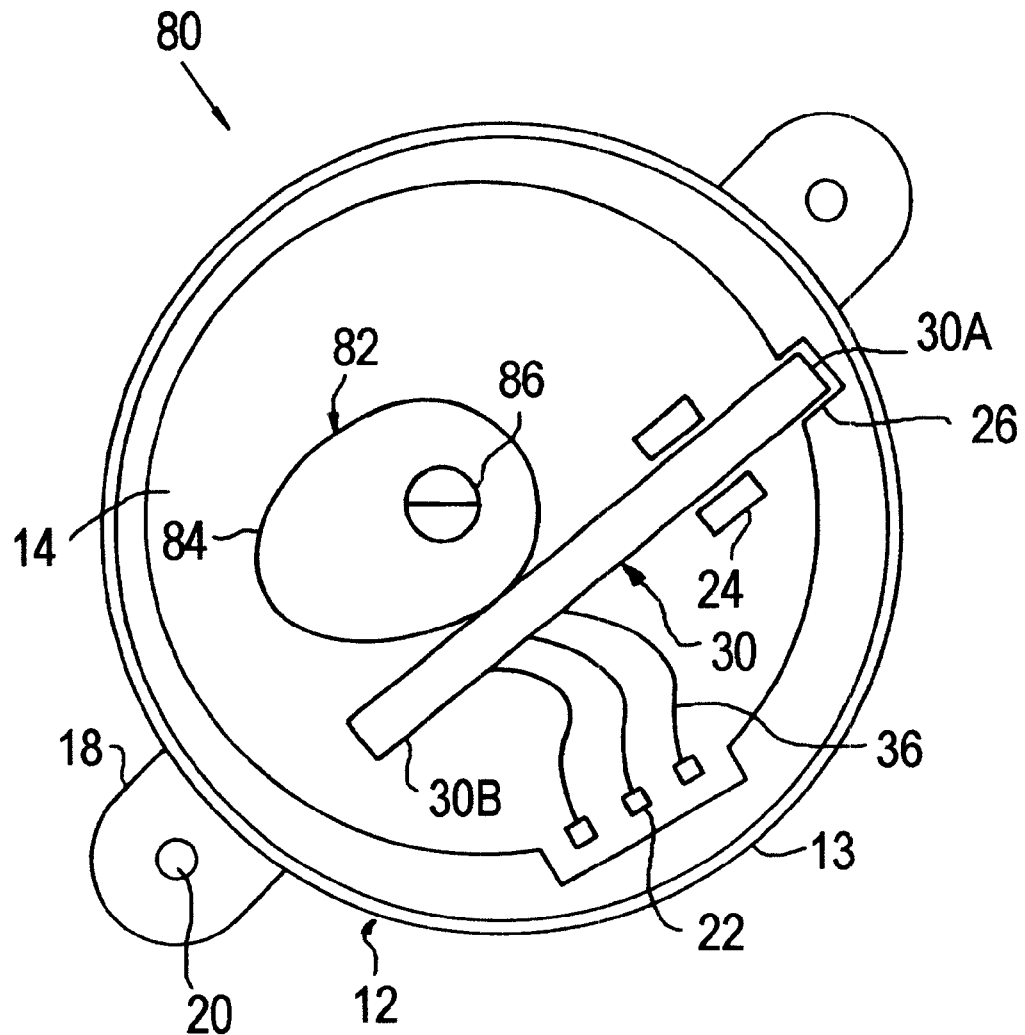
FIG. 4 is a top assembled view of FIG. 3 with the cover removed.

Referring to FIGS. 3 and 4, another embodiment of a rotary position sensor using a strain gage 80 is shown. A housing 12 has an outer circumferential wall 13 that defines a cavity 14. A bore 15 is located at the bottom of cavity 14. A connector shroud 16 and a pair of mounting flanges 18 extend from housing 12. Mounting flanges 18 have a mounting hole 20 passing therethrough for bolting or screwing to a mounting location. Terminals 22 are located in connector shroud 16 for connecting with an external electrical connector (not shown). Only three terminals are shown, more or less may be required. Terminals 22 may be molded in shroud 16 or inserted by pressing. A pair of support posts 24 extend upwardly from the bottom of the cavity. A slot 26 extends into wall 13 from cavity 14. A strain gage 30 has one end 30A that is held in slot 26 and a free end 30B. The support posts 24 help to support strain gage 24 in cavity 14. Strain gage 30 has four strain sensitive resistors 32 mounted thereon and connected in a Wheatstone bridge configuration. Strain gage 30 is preferably formed from steel. Strain sensitive resistors 32 are preferably conventional thick film resistors. Details of the manufacture and design of strain gage 30 is disclosed in U.S. Pat. No. 6,161,891, issued Dec. 19, 2000 and entitled, "Vehicle Seat Weight Sensor", the contents of which are herein included by reference in entirety. The strain sensitive resistors 32 are connected to terminals 22 by wires 36. Wires 36 may be attached to the resistors and terminals by conventional methods such as soldering or ultrasonic wire bonding.

A cam or cam shaped rotor 82 has a lobe 84, a recess 86 and a protrusion 88. Protrusion 88 fits into bore 15 in order to retain cam 82 in cavity 14. Lobe 84 is in contact with strain gage end 30B. A cover 54 is ultrasonically welded or heat staked to wall 13 to seal the sensor 80. Cover 54 has a shaft aperture 56 that allows shaft 58 of an attached object to pass through cover 54. The shaft is part of the object whose position is desired to be sensed. Shaft 58 has a D shape that fits into the D shape of recess 46. Shaft 58 drives or rotates cam 82 during operation of sensor 10. A seal 52 fits over shaft 58 to seal cavity 14 from potentially harmful external environmental conditions.

Rotary position sensor using a strain gage 80 operates as follows: a rotating shaft 58 of an external device whose position is desired to be sensed is located in aperture 56 and as the shaft rotates, cam 82 also rotates and lobe 84 applies pressure to strain gage 30. As lobe 84 rotates toward strain gage 30, pressure is applied on end 30B of strain gage 30. An external voltage is applied to some of terminals 22 and flows through resistors 32. The force on end 30B causes strain to be applied to the resistors 32. The strain in resistors 32 causes their electrical resistance to change and subsequently the voltage drop across the resistors to change. The resistors are connected in a Wheatstone bridge configuration. The electrical output signal from the bridge is connected to another terminal, which can connect with an external electrical connector such as a wiring harness. Thus, as the shaft 58 rotates, an electrical signal is generated that is indicative of the position of the attached object. Similarly, when the cam 82 rotates away from strain gage 30, the strain on resistors 32 will be reduced and the electrical signal will change accordingly.

Figure 5:
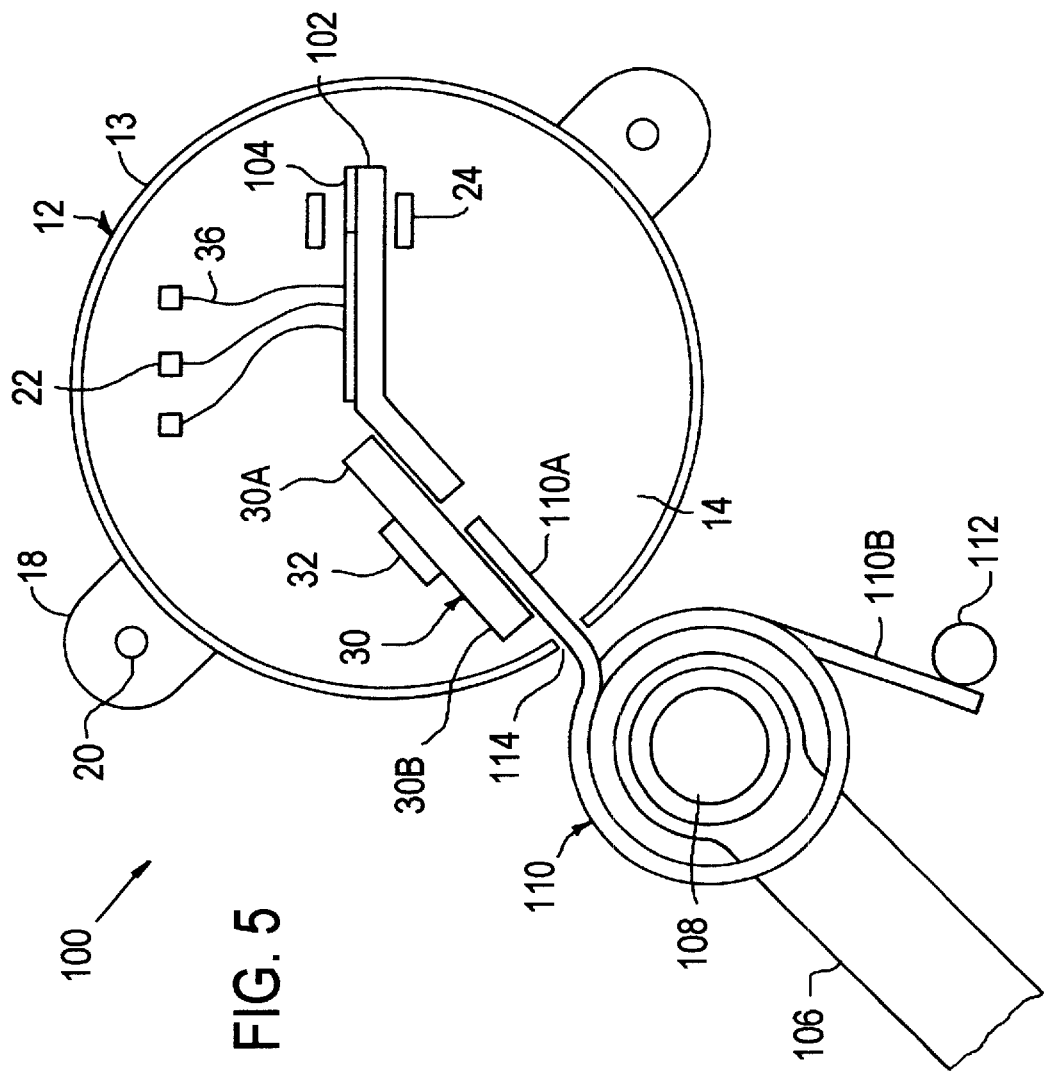
FIG. 5 is an side view of an another embodiment of a Rotary Position Sensor Using a Strain Gage.

Referring to FIG. 5, another embodiment of a rotary position sensor using a strain gage 100 is shown. A housing 12 has an outer circumferential wall 13 that defines a cavity 14. Mounting flanges 18 extend from housing 12. Mounting flanges 18 have a mounting hole 20 passing therethrough for bolting or screwing to a mounting location. Terminals 22 are for connecting with an external electrical connector (not shown). Only three terminals are shown, more or less may be required. Terminals 22 may be molded or inserted by pressing. A pair of support posts 24 extend upwardly from the bottom of the cavity. A support 102 is supported between posts 24. Support 102 has a printed circuit board 104 mounted to one end and a strain gage 30 mounted on the other end. Strain gage 30 has one end 30A that attached to support 102. Strain gage 30 has four strain sensitive resistors 32 mounted thereon and connected in a Wheatstone bridge configuration. Strain gage 30 is preferably formed from steel. Strain sensitive resistors 32 are preferably conventional thick film resistors. Details of the manufacture and design of strain gage 30 is disclosed in U.S. Pat. No. 6,161,891, issued Dec. 19, 2000 and entitled, "Vehicle Seat Weight Sensor", the contents of which are herein included by reference in entirety. The strain sensitive resistors 32 are connected to terminals 22 by wires 36. Wires 36 may be attached to the resistors and terminals by conventional methods such as soldering or ultrasonic wire bonding.

A pedal arm 106 is attached to a shaft 108. Pedal arm 106 rotates around shaft 108. A torsion spring 110 is located around shaft 108. Spring 110 has two ends, 110A and 110B. Spring end 110A rests against in contact with strain gage end 30B. Spring end 110A passes through aperture 114 in wall 13. Spring end 110B rests against post 112. A cover (not shown) would be ultrasonically welded or heat staked to wall 13 to seal the sensor.

Rotary position sensor using a strain gage 100 operates as follows: a user depressing pedal arm 106 causes shaft 108 to rotate which in turn causes the tension in spring 110 to increase. This tension is transmitted to end 110A and applies pressure to strain gage 30. An external voltage is applied to some of terminals 22 and flows through resistors 32. The force on end 30B causes strain to be applied to the resistors 32. The strain in resistors 32 causes their electrical resistance to change and subsequently the voltage drop across the resistors to change. The resistors are connected in a Wheatstone bridge configuration. The electrical output signal from the bridge is connected to another terminal, which can connect with an external electrical connector such as a wiring harness. Thus, as the pedal arm 106 is depressed, an electrical signal is generated that is indicative of the position of the pedal arm. Similarly, when the pedal arm 106 rotates the other way the strain on resistors 32 will be reduced and the electrical signal will change accordingly.

While the invention has been taught with specific reference to these embodiments, someone skilled in the art will recognize that changes can be made in form and detail without departing from the spirit and the scope of the invention. The described embodiments are to be considered in all respects only as illustrative and not restrictive. The scope of the invention is, therefore, indicated by the appended claims rather than by the description. All changes that come within the meaning and range of equivalency of the claims are to be embraced within their scope.

What is claimed is:

1. A position sensor for sensing the position of an object, comprising:
    a) a housing having a slot therein;
    b) a rotor, attachable to the object and positioned in the housing;
    c) a planar substrate having a first end and a second end, the substrate further having a first side and a second side, the substrate having the first end positioned in the slot to hold the substrate and the first side adjacent the rotor at the second end of the substrate, the rotor rotating so as to contact the substrate and apply strain thereto;
    d) at least one strain sensitive resistor mounted on the second surface opposite the rotor, the strain sensitive resistor generating an electrical signal when stressed that is proportional to the position of the object; and
    e) a plurality of terminals attached to the housing and electrically connected to the resistor.

2. The position sensor according to claim 1, wherein four strain sensitive resistors are connected in a wheatstone bridge.

3. The position sensor according to claim 1, wherein the rotor has a spring located between the rotor and the substrate.

4. The position sensor according to claim 1, wherein the rotor is a cam.

5. The position sensor according to claim 1, wherein the rotor is an arm.

6. A position sensor for sensing the position of an attached object, comprising:
   a) a housing;
   b) a rotor, having a first and second end, the rotor positioned within the housing, the first end of the rotor attachable to the object, the rotor rotating as the object rotates;
   c) a strain gage positioned in the housing, the strain gage having a first and second surface, the second end of the rotor in contact with the first surface of the strain gage at the second end, the rotor applying strain to the strain gage, the strain gage generating an electrical signal that is proportional to the rotational position of the object; and
   d) a plurality of terminals attached to the housing and electrically connected to the strain gage.

7. The position sensor according to claim 6, wherein the strain gage has at least one strain sensitive resistor disposed on the second surface.

8. The position sensor according to claim 7, wherein the strain gage has four strain sensitive resistors connected in a wheatstone bridge.

9. The position sensor according to claim 8, wherein the rotor has a spring located between the second end and the strain gage.

10. A position sensor for sensing the position of an attached object, comprising:
    a) a housing;
    b) a cam shaped rotor, having a lobe and a recess, the rotor positioned within the housing, the recess of the rotor attachable to the object, the rotor rotating as the object rotates;
    c) a strain gage positioned in the housing, the strain gage having a first surface and a second surface, lobe in contact with the strain gage and first surface of the applying strain thereto, the strain gage generating an electrical signal that is proportional to the rotational position of the object; and
    d) a plurality of terminals attached to the housing and electrically connected to the strain gage.

11. The position sensor according to claim 10, wherein the strain gage has at least one strain sensitive resistor disposed on the second surface.

12. The position sensor according to claim 11, wherein the strain gage has four strain sensitive resistors connected in a wheatstone bridge.

13. The position sensor according to claim 10, wherein the strain gage is mounted in a slot in the housing.

14. A position sensor for sensing the position of a pedal, the pedal having a pedal arm that rotates about a shaft, comprising:
    a) a housing;
    b) a spring disposed around the shaft and having a spring end extending into the housing;
    c) a strain gage positioned in the housing, adjacent the spring end, the spring end biasing the strain gage and applying pressure thereto when the pedal arm is depressed, the strain gage generating an electrical signal that is proportional to the position of the pedal arm; and
    d) a plurality of terminals attached to the housing and electrically connected to the strain gage.

15. The position sensor according to claim 14, wherein the strain gage has at least one strain sensitive resistor disposed thereon.

16. The position sensor according to claim 15, wherein the strain gage has four strain sensitive resistors connected in a wheatstone bridge.

17. The position sensor according to claim 16, wherein the strain gage is mounted to a printed circuit board.

* * * * *